Figure 1:
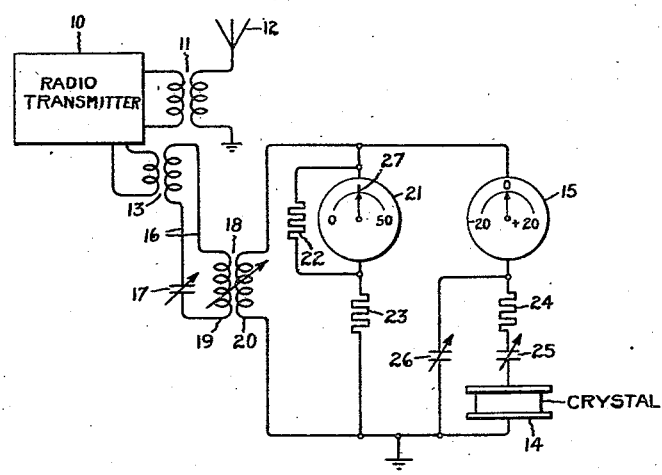

March 7, 1944.  C. F. BALDWIN  2,343,633

FREQUENCY MEASURING DEVICE

Filed Oct. 7, 1941

Inventor:
Charles F. Baldwin,
by Harry E. Dunham
His Attorney.

Patented Mar. 7, 1944

2,343,633

UNITED STATES PATENT OFFICE 2,343,633

FREQUENCY MEASURING DEVICE

Charles F. Baldwin, Schenectady, N. Y., assignor to General Electric Company, a corporation of New York Application October 7, 1941, Serial No. 413,949

7 Claims. (Cl. 250—39)

My invention relates to frequency measuring devices, and more particularly to such devices utilizing a piezoelectric vibrator as a frequency standard.

Frequency meters, which utilize doubly resonant devices having a series resonant frequency and a parallel resonant frequency as frequency standards, generally operate in one of two ways. Such frequency meters may, for example, include an oscillator whose frequency is determined by the resonant device, the output of the oscillator being heterodyned with the frequency to be measured, and the resulting beat frequency measured separately. Such a frequency meter requires an accurate frequency measuring device for measuring the beat frequency.

Alternatively, the doubly resonant device may be used as a filter through which the waves whose frequency is to be measured may be transmitted, the ratio between the input intensity and output intensity of the wave being a measure of its frequency. Such a meter is useful only over the small range of frequencies between the two characteristic series and parallel resonant frequencies of such a doubly resonant device, between which frequencies the change of impedance of the device is substantially linear with respect to frequency.

Such a meter which indicates frequency by indicating the change of impedance with respect to frequency of a doubly resonant device, such, for example, as a piezoelectric device or quartz crystal vibrator, is very sensitive and accurate within the small range of frequencies between its two characteristic frequencies. It is, however, frequently desirable to use such a frequency meter over a wider range of frequencies. This may be desired for one particular frequency meter, or it may be desired to manufacture such frequency meters according to a uniform design and yet have any one capable of use over its small range of frequencies selected anywhere in a wide range of frequencies. An obvious solution is to provide a different doubly resonant device to be used in the frequency meter for each small range of frequencies within which measurements are desired.

Such a solution is expensive, and often impractical, because piezoelectric devices, such as quartz crystal vibrators, are difficult of manufacture, and must be carefully ground for operation over any particular small band of frequencies. Once their operating range is adjusted, it can generally be changed only by further grinding of the crystal.

It is accordingly an object of my invention to provide an improved and simplified frequency meter including a doubly resonant device which may be readily adjusted over a substantial range of frequencies without the necessity of changing the doubly resonant device.

It is a further object of my invention to provide such an improved and simplified frequency meter which may be used with different piezoelectric devices over a wide range of frequencies in which the amount of change of impedance with respect to frequency may be easily adjusted without mechanical alteration of the piezoelectric device.

It is also an object of my invention to provide such an improved and simplified frequency meter in which the frequency band over which the device operates may be simply adjusted and the rate of change of impedance with respect to frequency may be separately adjusted without alteration of the doubly resonant device.

It is also an object of my invention to provide such a meter which can easily be readjusted with the same piezoelectric device to operate over different frequency bands within a certain range, and to operate over different frequency bands in a larger range with different piezoelectric devices, the meter being adjustable so that within any frequency band in such large range the impedance change of the particular piezoelectric device with respect to frequency is substantially constant.

The features of my invention which I believe to be novel are set forth with particularity in the appended claims. My invention itself, both as to its organization and manner of operation, together with further objects and advantages thereof may best be understood by reference to the following description taken in connection with the accompanying drawing in which Fig. 1 illustrates one embodiment of my invention and Fig. 2 represents such operating characteristics of the embodiment of Fig. 1.

Figure 2:
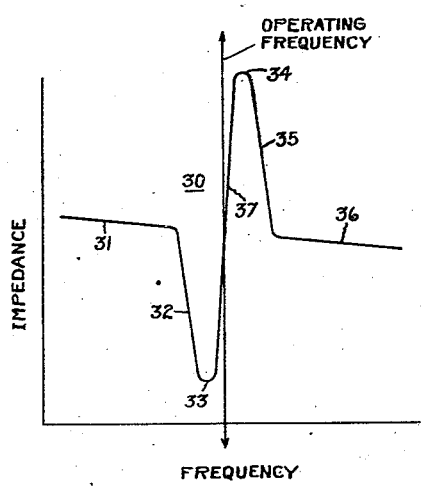

In Fig. 1 a radio transmitter 10 generates a carrier wave which is impressed upon a transformer 13, and which, after being desirably modulated by signals is also transferred through a transformer 11 to an antenna 12 from which the wave is radiated. From the transformer 13 the unmodulated carrier wave is transmitted to a quartz crystal vibrator 14 in series with a current indicating instrument 15.

The transformer 13, the crystal 14, and the instrument 15, together with means for adjusting the amount of voltage of carrier frequency impressed on the crystal 14 and instrument 15, and means for adjusting the characteristics of the crystal 14, form a frequency measuring instrument. Carrier waves from the transformer 13 are transmitted through a two-conductor cable 16, and through a tuning condenser 17, to a transformer 18. The transformer 18 is so arranged that the coupling between its primary 19 and secondary 20 may be adjusted between wide limits. The condenser 17 is adjusted so as to insure that a sufficient amount of the carrier wave from the transmitter 10 shall reach the transformer 18.

One terminal of the secondary 20 of transformer 18 is grounded, and a voltage indicating instrument 21 is connected between the terminals of the secondary 20. A shunting resistance 22 may be connected between the terminals of the instrument 21, as desired, to adjust the sensitivity of the instrument, and a multiplying resistance 23 may be connected in series with the instrument 21 so that the instrument 21 may indicate a higher voltage at its full scale reading than the voltage across its terminals at such time.

The crystal 14 and the current indicating instrument 15 are connected in series between the terminals of the secondary 20 of transformer 18, and a resistance 24, preferably fixed in value, and a variable condenser 25 are connected in the same series circuit adjacent the crystal 14. A second variable condenser 26 is connected in shunt to the series combination of crystal 14, resistance 24, and condenser 25. The resistance 24 and condensers 25 and 26 constitute means for adjusting the impedance characteristics of the crystal 14 with respect to frequency.

A quartz crystal vibrator, or any similar doubly resonant device, has a non-linear relation between impedance and frequency over a certain range of frequency, as illustrated by the curve 30 of Fig. 2. As the frequency at which the impedance is measured increases from a low value, the impedance of such a device slowly decreases, as is illustrated by the straight line portion 31 of the curve 30. As the frequency further increases within a small range, the impedance of the device decreases more rapidly, as is illustrated by the portion 32 of the curve 30. At the series resonant frequency the impedance of the piezoelectric device is minimum, as illustrated at point 33 on the curve 30.

Upon further increase in frequency the impedance of the device increases rapidly along a relatively straight portion 37 of the curve to the parallel resonant frequency, at which the impedance of the device is a maximum, as illustrated at point 34 on the curve 30. The impedance change of the device over a considerable frequency range between points 33 and 34 is substantially linear with respect to frequency. As the frequency increases further from point 34, the impedance of the device further decreases rapidly, as illustrated by the portion 35 of curve 30, and thereafter decreases slowly, as indicated by the portion 36 of the curve 30.

When using such a doubly resonant device (e. g., a quartz crystal vibrator) as a frequency measuring device, it is usually desirable that frequencies be measured which lie well within the limits marked by points 33 and 34 of the curve 30, so that such frequencies correspond to the long straight portion 37 of the curve 30 between such points 33 and 34. When the device is so used, its impedance changes rapidly and substantially linearly upon a change in frequency.

Adjustment of the variable condenser 25, which is connected in series with the crystal 14, is effective to shift the whole curve 30 with respect to frequency by a substantial amount in either direction. As the capacity of the condenser 25 is increased, the frequency of the series resonant point 33, as well as the frequency of the parallel resonant point 34, is lowered. Conversely, as the capacity of the condenser 25 is decreased, the frequencies of these points 33 and 34 are raised. During such adjustment of the series condenser 25, the difference in frequency between the points 33 and 34 remains substantially unchanged.

Consequently, by the use of the series condenser 25, the frequency meter including the crystal 14 may be adjusted for use over a considerably greater range of frequencies than the range between the points 33 and 34 of Fig. 2.

When such frequency meters are manufactured in large quantities, it is desirable that they be easily manufactured and adjusted to indicate the same number of cycles deviation in frequency near any frequency within a wide band, such band, for example, being the radio broadcast band from 540 to 1600 kilocycles. Without adjustment, a crystal 14 which is ground for monitoring a carrier wave frequency, at, for example, 1500 kilocycles, exhibits a greater frequency difference between points 33 and 34 of Fig. 2 than does a similar crystal, which is ground for monitoring a carrier wave frequency, for example, at 550 kilocycles. The frequency difference between the points 33 and 34 of the first crystal would, in fact, be nearly three times as large as the frequency difference between the same points for the last crystal.

Since present communication standards require that the frequency of the carrier wave radiated by a radio transmitter operating in the broadcast band be maintained constant within a certain number of cycles, regardless of carrier wave frequency, it is desirable that means be supplied in connection with the crystal 14 for decreasing the frequency difference between points 33 and 34 of Fig. 2 for crystals operating at the higher frequencies in the broadcast band, or to increase the frequency difference between such points 33 and 34 for crystals operating at lower frequencies in the broadcast band.

As illustrated, the current indicating instrument 15 represents a total frequency deviation of 40 cycles, the center of the meter being marked zero, and the extremes of the scale being marked —20 and +20, respectively. Such sensitivity is typical in this type of frequency meter, but may, if desired, be given other widely different values, dependent on the impedance change between the points 33 and 34 of the available double resonant devices, such as quartz crystals.

Having thus selected the desired sensitivity, and having selected a suitable doubly resonant device, such as the crystal 14, the variable condenser 25 is adjusted so that the curve 30 of Fig. 2 for the selected device is centered about the desired operating frequency of the carrier wave generator. It is next determined whether the straight portion 37 of the curve 30 is too steep, or is not sufficiently steep, to give the desired deflection on the current indicating instrument 15, when the frequency of a wave from the transformer 13 departs from the above-mentioned operating frequency by an amount corresponding to the indications on the instrument 15. Generally, at high frequencies the straight portion 37 of the curve 30 will not be sufficiently steep, while at low frequencies this straight portion 37 will be too steep. A quartz crystal vibrator is characterized by a rapid impedance change over the straight portion 37, such that the impedance may change from a few hundred ohms at the series resonant point 33 to several thousand ohms at the parallel resonant point 34, when the two points are spaced apart by about 100 cycles.

If the doubly resonant device, such as the crystal 14, is to operate at a relatively high frequency, for example, at an operating frequency of 1500 kilocycles, and the desired sensitivity as indicated by the meter 15 is such that the straight portion 37 of the curve 30 is not sufficiently steep, increase in capacity of the variable condenser 26 is effective to increase the pitch of this portion of the curve. Such increase of the capacity of the condenser 26 reduces the frequency of the parallel resonant point 34, but has no substantial effect on the frequency of series resonant point 33.

In this case, where the straight portion 37 of the curve 30 is initially not sufficiently steep, the resistance 24 need not be used at all, and may be omitted. To make the adjustment, the condenser 26 may be increased in value, while the curve 30 is maintained centered about the operating frequency by adjustment of condenser 25, until the straight portion 37 of the curve 30 is of the desired pitch. At this condition of adjustment, the current indicating instrument 15 reads zero, at the center of the scale, when the frequency of the wave from the transformer 13 is at the desired operating frequency. The instrument 15 reads −20 or +20 as the frequency of the carrier wave from the transformer 13 is respectively 20 cycles below or above the desired operating frequency.

During all the adjustment of the condensers 25 and 26, as well as during all changes in frequency of the carrier wave from the transformer 13, the needle of the voltage indicating instrument 21 must be kept at a fixed point on its scale, such as the point 27. This is necessary in order that the voltage across the secondary 20 of the transformer 18 be maintained constant, so that current flowing through the current indicating instrument 15 is in direct proportion to the impedance of the doubly resonant device comprising the crystal 14, resistance 24, and condensers 25 and 26.

If the frequency meter is to be used at a relatively low frequency, near which the impedance change of the crystal 14 is greater than that necessary to produce the desired reading of the current indicating instrument 15, the resistance 24 may be used to reduce the rate of change of impedance with respect to frequency. The value of the resistance 24 for such a low frequency crystal 14 is made such that, with the condenser 26 at its minimum value, the impedance change with respect to frequency of the doubly resonant device including the crystal 14, resistance 24 and condensers 25 and 26 is less than that desired.

The resistance 24 operates by introducing damping into the doubly resonant circuit. The impedance of the doubly resonant device at the series resonant point 33 depends primarily on the amount of damping in the series circuit through the crystal 14, which damping is increased by the resistance 24, with consequent increase in impedance at the point 33. The impedance of the doubly resonant device at the parallel resonant point 34, is reduced by the introduction of damping into the parallel circuit including the crystal 14 and the condenser 26. As a consequence of these two changes the impedance change between the points 33 and 34 is made less. The straight portion 37 of the curve 30 is thus made less steep by use of the resistance 24.

After the doubly resonant device including the crystal 14, resistance 24, and condensers 25 and 26 is made to have an impedance characteristic along the straight portion 37 of the curve 30, which is not sufficiently steep, final adjustment is made by increasing the value of condenser 26, as was described previously for the frequency meter without the resistance 24, until the parallel resonant frequency at the point 34 decreases an amount just sufficient to make the straight portion 37 of the curve 30 of the desired steepness.

As was indicated before, it is necessary during all these adjustments, not only to keep the curve 30 well centered about the operating frequency by adjustment of the condenser 25, but also to keep the voltage across the secondary 20 of the transformer 18 constant by maintaining the needle of the voltage indicating instrument 21 at the mark 27.

After such adjustments have all been completed, the frequency meter is ready for use. Whenever any wave is impressed on the transformer 13 whose frequency lies between the frequency measuring limits of the meter, its frequency is indicated by deviation of the needle of instrument 15 from zero.

It is generally desirable that the condenser 17 be adjusted so that the secondary of the transformer 13, the two-conductor cable 16, and the primary 19 of the transformer 18, are altogether made resonant near the frequency of the carrier wave impressed on the transformer 13. Thereafter adjustment of the coupling between the primary 19 and secondary 20 of the transformer 18 may be utilized to adjust the voltage across the secondary 20 until the needle of the instrument 21 remains at the point 27. If the primary 19 and secondary 20 cannot be decoupled sufficiently to reduce the voltage a desired amount, the condenser 17 may be readjusted to detune its circuit, and consequently reduce the voltage transfer from transformer 13 to transformer 18.

As manufactured, it is usually desirable to place the frequency meter in a suitable cabinet, the panel of which contains the instruments 15 and 21, control knobs for the condensers 17 and 25 and a control knob for adjusting the coupling between the primary 19 and the secondary 20 of the transformer 18. Adjustment of the resistance 24 and condenser 26 may be made at the factory, and need not be changed thereafter unless the crystal 14 is changed.

When initially installing the frequency meter, it may be necessary to adjust the coupling between the primary and secondary of transformer 13, the secondary of which is usually a few turns of wire loosely coupled to a circuit following the master oscillator of the radio transmitter 10, so that the condenser 17 may be adjusted to resonance, and coupling between the primary 19 and secondary 20 of the transformer 18 thereafter utilized to keep the needle of the instrument 21 on the mark 27.

It is, of course, desirable that both of the instruments 15 and 21 be of a type which is not responsive to frequency, at least within the range of frequencies of waves impressed on the frequency meter. It is convenient to use thermocouple instruments for the instruments 15 and 21. It is obvious, however, that other types of instruments may be used, and other means for indicating the impedance of the doubly resonant impedance network including the crystal 14, the resistance 24, and the condensers 25 and 26 may be utilized.

In a typical frequency meter of this type, the condensers 25 and 26 may, for example, be of 140 micromicrofarads each, while the resistance 24 must be given a value, as explained above, for any particular crystal 14, such that the desired impedance change with respect to frequency is obtained.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, a doubly resonant device having a series resonant frequency and a parallel resonant frequency and a substantially linear rate of change of impedance with changes in frequency between said series and parallel resonant frequencies, means consisting of a variable first condenser in series circuit relation with said device for adjusting simultaneously the series and parallel resonant frequencies of said device without appreciably affecting said rate of change of impedance, means including a condenser in parallel circuit relation with said device and said first condenser for adjusting said parallel resonant frequency without substantially affecting said series resonant frequency thereby to control said rate of change of impedance, and means for measuring said impedance.

2. In combination, a doubly resonant device having a parallel resonant frequency and a series resonant frequency at which frequencies the impedance of said device is substantially different, means for adjusting simultaneously the series and parallel resonant frequencies of said device, means for adjusting one of said frequencies without substantially affecting the other thereby to adjust the rate of change of impedance of said device with respect to frequency between said two frequencies, said device and said two adjusting means forming a network whose impedance varies substantially linearly with frequency between said two frequencies, and means for measuring the impedance of said network.

3. In combination, a piezoelectric device, means for adjusting simultaneously the series and parallel resonant frequencies of said device, means for adjusting said parallel resonant frequency without substantially affecting said series resonant frequency, said device and said two adjusting means forming a network whose impedance varies substantially linearly with frequency between said two frequencies, and means for measuring the impedance of said network.

4. In combination, a piezoelectric device, means including a condenser in series with said device for adjusting simultaneously the series and parallel resonant frequencies of said device, means including a resistance in series with said device and said first condenser for reducing the rate of change of impedance with frequency of said device as the frequency is varied between said series and parallel resonant frequencies, means including a condenser in shunt to said device, said first condenser and said resistance for adjusting said parallel resonant frequency without substantially affecting said series resonant frequency, said device and said three adjusting means forming a network whose impedance varies substantially linearly with frequency between said two frequencies, and means for measuring the impedance of said network.

5. In combination, a source of waves whose frequency is to be measured, a doubly resonant device having a series resonant frequency and a parallel resonant frequency and a substantially linear rate of change of impedance with changes in frequency between said series and parallel resonant frequencies, means for connecting said source across said doubly resonant device, means for adjusting the range of frequencies over which the impedance change of said device is substantially linear with respect to frequency consisting of a variable condenser connected in series circuit relation with said doubly resonant device across said source for simultaneously adjusting said series and parallel resonant frequencies, and means for measuring said impedance to indicate the frequency of waves from said source.

6. In combination, a source of waves whose frequency is to be measured, a doubly resonant device having a series resonant frequency and a parallel resonant frequency and a substantially linear rate of change of impedance with changes in frequency between said series and parallel resonant frequencies, means for connecting said source across said doubly resonant device, means for adjusting the range of frequencies over which the impedance change is substantially linear with respect to frequency consisting of a variable capacity in series circuit relation with said doubly resonant device for adjusting simultaneously the series and parallel resonant frequencies thereof, means for adjusting the rate of change of impedance with respect to frequencies between the series and parallel resonant frequencies comprising a variable capacity in parallel circuit relation with said doubly resonant device and said first mentioned condenser for adjusting the parallel resonant frequency without substantially affecting the series resonant frequency, and means for measuring said impedance to indicate the frequency of waves from said source 7. In combination, a doubly resonant device having a series resonant frequency and a parallel resonant frequency and a substantially linear rate of change of impedance with changes in frequency between said series and parallel resonant frequencies, means consisting of a variable condenser connected in series circuit relation with said device for simultaneously adjusting said series and parallel resonant frequencies without appreciably affecting said rate of change of impedance, means including a variable condenser connected in parallel circuit relation with said device and with said first condenser for adjusting said parallel resonant frequency without appreciably affecting said series resonant frequency thereby to control said rate of change of impedance, means comprising a resistor connected in series circuit relation with said device for adjusting the impedance of said device at said series resonant frequency thereby to control the rate of change of impedance of said device between said series and parallel resonant frequencies without appreciably affecting said frequencies, and means for measuring said impedance.

CHARLES F. BALDWIN.